(12) United States Patent
Sirkin

(10) Patent No.: US 12,413,593 B2
(45) Date of Patent: Sep. 9, 2025

(54) MULTI-LEVEL CYBERSECURITY RISK ASSESSMENT AND MITIGATION SYSTEM

(71) Applicant: Mark Sirkin, White Plains, NY (US)

(72) Inventor: Mark Sirkin, White Plains, NY (US)

( * ) Notice: Subject to any disclaimer, the term of this patent is extended or adjusted under 35 U.S.C. 154(b) by 130 days.

(21) Appl. No.: 18/020,922

(22) PCT Filed: Aug. 7, 2021

(86) PCT No.: PCT/IB2021/057296
§ 371 (c)(1),
(2) Date: Feb. 10, 2023

(87) PCT Pub. No.: WO2022/034461
PCT Pub. Date: Feb. 17, 2022

(65) Prior Publication Data
US 2023/0308449 A1    Sep. 28, 2023

Related U.S. Application Data

(60) Provisional application No. 63/064,136, filed on Aug. 11, 2020.

(51) Int. Cl.
*H04L 29/06* (2006.01)
*G06Q 10/0631* (2023.01)
*H04L 9/40* (2022.01)

(52) U.S. Cl.
CPC ...... *H04L 63/102* (2013.01); *G06Q 10/06311* (2013.01); *H04L 63/105* (2013.01)

(58) Field of Classification Search
CPC ............... H04L 63/102; H04L 63/105; G06Q 10/06311; G06Q 50/20; G09B 5/00; G09B 7/02; G06F 21/577
See application file for complete search history.

(56) References Cited

U.S. PATENT DOCUMENTS

| | | | | |
|---|---|---|---|---|
| 8,776,168 B1* | 7/2014 | Gibson | .................. | H04L 63/102 709/225 |
| 2008/0047017 A1* | 2/2008 | Renaud | .................... | G06F 21/46 705/14.69 |
| 2015/0324559 A1* | 11/2015 | Boss | ....................... | G06Q 50/01 726/1 |
| 2016/0173520 A1* | 6/2016 | Foster | ................... | G06F 21/316 726/25 |
| 2019/0050578 A1* | 2/2019 | Choi | ........................ | G06F 21/53 |

(Continued)

*Primary Examiner* — Ka Shan Choy
(74) *Attorney, Agent, or Firm* — William E Crouse; Russell F. Gribbell; Frederick H. Gribbell

(57) ABSTRACT

A cybersecurity system for mitigating cybersecurity threats to a protected system, comprising a risk assessment module, a training module, and an access control module. The risk assessment module is adapted to generate cybersecurity risk profiles for individual users, teams of multiple users, and organizations. The risk profiles are utilized to identify cybersecurity vulnerabilities at the individual, team, and organizational levels, and mitigate the identified cybersecurity vulnerabilities through targeted remedial cybersecurity training regimes implemented via the training module. The access control module is adapted to mitigate the identified cybersecurity risk by restricting access to the protected system for high risk individual users or teams who are likely to compromise the cybersecurity integrity of the protected system.

15 Claims, 14 Drawing Sheets

(56) References Cited

U.S. PATENT DOCUMENTS

2021/0029129 A1\* 1/2021 Gupta .................... H04L 63/08
2021/0272473 A1\* 9/2021 Boskovic ............ H04L 63/1433
2021/0314340 A1\* 10/2021 Ubriani ................ G06F 21/316
2021/0377286 A1\* 12/2021 Shukla ................. G06F 21/577

\* cited by examiner

| Dimensional Risk Scores | User A | User B | User C |
|---|---|---|---|
| Openness | 85 | 47 | 32 |
| Conscientiousness | 15 | 38 | 93 |
| Extroversion | 92 | 67 | 45 |
| Agreeableness | 81 | 42 | 41 |
| Neuroticism | 45 | 32 | 53 |
| Loyalty | 12 | 55 | 88 |
| Reliability | 15 | 44 | 85 |
| Property | 69 | 72 | 11 |
| Past Computer Offenses | 88 | 70 | 10 |
| Overall Individual Risk Rating | High Risk | Medium Risk | Low Risk |
| Individual Action Recommendation | Deny Access | Allow Access after training and monitoring | Allow Access with minimal training |

FIG. 3B

Instructions: Please rate the items below on a scale from 1-5, based on how true they are for you in most instances.

19P → 1. I follow a schedule.

19P → 2. I am exacting in my work.

19P → 3. I try not to obsess over the details. (reverse scored, 1=5, 2=4, 3=3, 4=2, 5=1))

19P → 4. I like to go with the flow and not over-plan things. (reverse scored 1=5, 2=4, 3=3, 4=2, 5=1))

| Table of Risky Cybersecurity Behaviors | Associated Personality Traits |
|---|---|
| | |
| Poor management of passwords | Low Conscientiousness |
| Sharing of log-in credentials | High Openness, Low Conscientiousness |
| Using unsecured public WiFi | Low Conscientiousness |
| | |
| Plugging in unauthorized USB devices to work computer | Low Conscientiousness |
| | |
| Revealing sensitive information via social media | High Extroversion, Low Conscientiousness |
| | |
| Clicking links from unsolicited emails | High Agreeableness, Low Conscientiousness |
| | |
| Sending personal information to strangers via the internet | High Openness, Low Conscientiousness, High Agreeableness |
| | |
| Clicking suspicious links from an otherwise trusted friend or colleague | High Agreeableness, Low Conscientiousness |
| | |
| Storing work related data on unauthorized personal devices | Low Conscientiousness, High Property Offenses |

FIG. 3D

| Team Members | Team Risk Score | Team Member Risk Rating |
|---|---|---|
| 12D— User D | 5 | High |
| 12E— User E | 9 | Medium |
| 12F— User F | 2 | Critical |
| 12G— User G | 15 | Low |
| 12H— User H | 11 | Low |

| | Mission | Strategic Direction and Intent | Goals and Objectives | Vision | Score |
|---|---|---|---|---|---|
| Organization A | | 84 | 87 | 79 | High |
| Organization B | | 16 | 20 | 10 | Low |
| Consistency | Core Values | Agreement | Coordination and Integration | Low | |
| Organization A | | 84 | 78 | 74 | High |
| Organization B | | 23 | 16 | 9 | Low |
| Adaptability | Creating Change | Customer Focus | Organizational Learning | | |
| Organization A | | 70 | 66 | 77 | High |
| Organization B | | 12 | 16 | 13 | Low |
| Involvement | Empowerment | Team Organization | Capability Development | | |
| Organization A | | 78 | 79 | 73 | High |
| Organization B | | 12 | 17 | 15 | Low |

*FIG. 5B*

MULTI-LEVEL CYBERSECURITY RISK ASSESSMENT AND MITIGATION SYSTEM

TECHNICAL FIELD

The present disclosure relates generally to a system for mitigating cybersecurity threats to a protected system. More particularly, the present disclosure relates to a cybersecurity system for identifying and mitigating cybersecurity vulnerabilities through personality-based analysis of users, social network analysis of teams, and cultural analysis of organizations.

BACKGROUND

Protecting the integrity and safety of data and computer systems in the digital world is critical to the operations of businesses, government agencies, and other organizations. Most conventional approaches to combating cybersecurity threats involve protecting an organization's digital assets and computer systems against external threats, such as hackers, malware, and other cybersecurity threats using costly hardware devices and software applications. However, cybersecurity research has demonstrated that almost ninety percent of an organization's cybersecurity risk originates from human factors, often exhibited by the organization's own users. For example, users may ignore cybersecurity policies and engage in risky online behavior, due to such factors as lack of training, insufficient awareness of cybersecurity threats, personality factors and dispositions, team dysfunction, and/or the effects of organizational culture. Certain users may even actively engage in cyber-crime and theft, thus causing tremendous damage to the organization from within. Conventional cybersecurity defenses, by focusing on external threats, are incapable of identifying and mitigating these human factors.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a system capable of identifying cybersecurity threats against a protected system by current and potential users, and mitigating or preventing these cybersecurity threats. Accordingly, the present disclosure provides a cybersecurity system for use with a protected system, comprising a risk assessment module, a training module, and an access control module. The cybersecurity system is adapted to present a plurality of individual users with a personality cybersecurity assessment survey to collect personality data. The personality data is utilized by the risk assessment module to quantify individual risk derived from a plurality of personality traits of each individual user, and identify potential cybersecurity vulnerabilities associated with the individual risk. The risk assessment module is further adapted to generate an individual action recommendation containing actions which are carried out by the cybersecurity system to mitigate the identified cybersecurity vulnerabilities, by implementing remedial cybersecurity training for the individual users via the training module, and limiting access to the protected system by the individual users via the access control module.

It is another aspect of an example embodiment in the present disclosure to provide a system capable of identifying cybersecurity threats against the protected system posed by teams of users. Accordingly, the present disclosure provides a risk assessment module adapted to conduct a team-based risk assessment for quantifying team risk linked to a team comprising multiple team members, by employing social network analysis to measure the relationships between team members and the contributions made by each team member towards team goals or objectives, to generate a team risk profile. The team risk profile allows the risk assessment module to identify cybersecurity vulnerabilities inherent in the characteristics of the team as a whole, as well as cybersecurity vulnerabilities related to the characteristics of individual team members. The risk assessment module is further adapted to generate a team action recommendation containing actions for mitigating the identified cybersecurity vulnerabilities, such as implementing remedial cybersecurity training for the team members via the training module directed towards the identified cybersecurity vulnerabilities, recommending changes to team assignments, or limiting access to the protected system by the team members via the access control module.

It is yet another aspect of an example embodiment in the present disclosure to provide a system capable of identifying and mitigating cybersecurity threats and weaknesses caused by organizational culture. Accordingly, the present disclosure provides a risk assessment module adapted to conduct an organizational risk assessment by measuring cultural traits exhibited by the organization to produce an organizational risk profile, and identifying cybersecurity vulnerabilities linked to weakly exhibited cultural traits. The risk assessment module is further adapted to generate a cultural action recommendation for mitigating the identified cybersecurity vulnerabilities, by implementing remedial cybersecurity training for the members of the organization, and recommending organizational changes and/or cultural improvements to reduce organizational risk.

The present disclosure addresses at least one of the foregoing disadvantages. However, it is contemplated that the present disclosure may prove useful in addressing other problems and deficiencies in a n umber of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

FIG. 3B is a table depicting sample personality sub-scores for a plurality of users which are analyzed to produce an individual overall risk rating for each of the users as well as an individual action recommendation, in accordance with an embodiment in the present disclosure.

FIG. 3D is a table depicting a list of cybersecurity vulnerabilities and associated personality traits, in accordance with an embodiment in the present disclosure.

FIG. 5B is a table depicting cultural traits and cultural scores for two example organizations, in accordance with an embodiment in the present disclosure.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 1A:
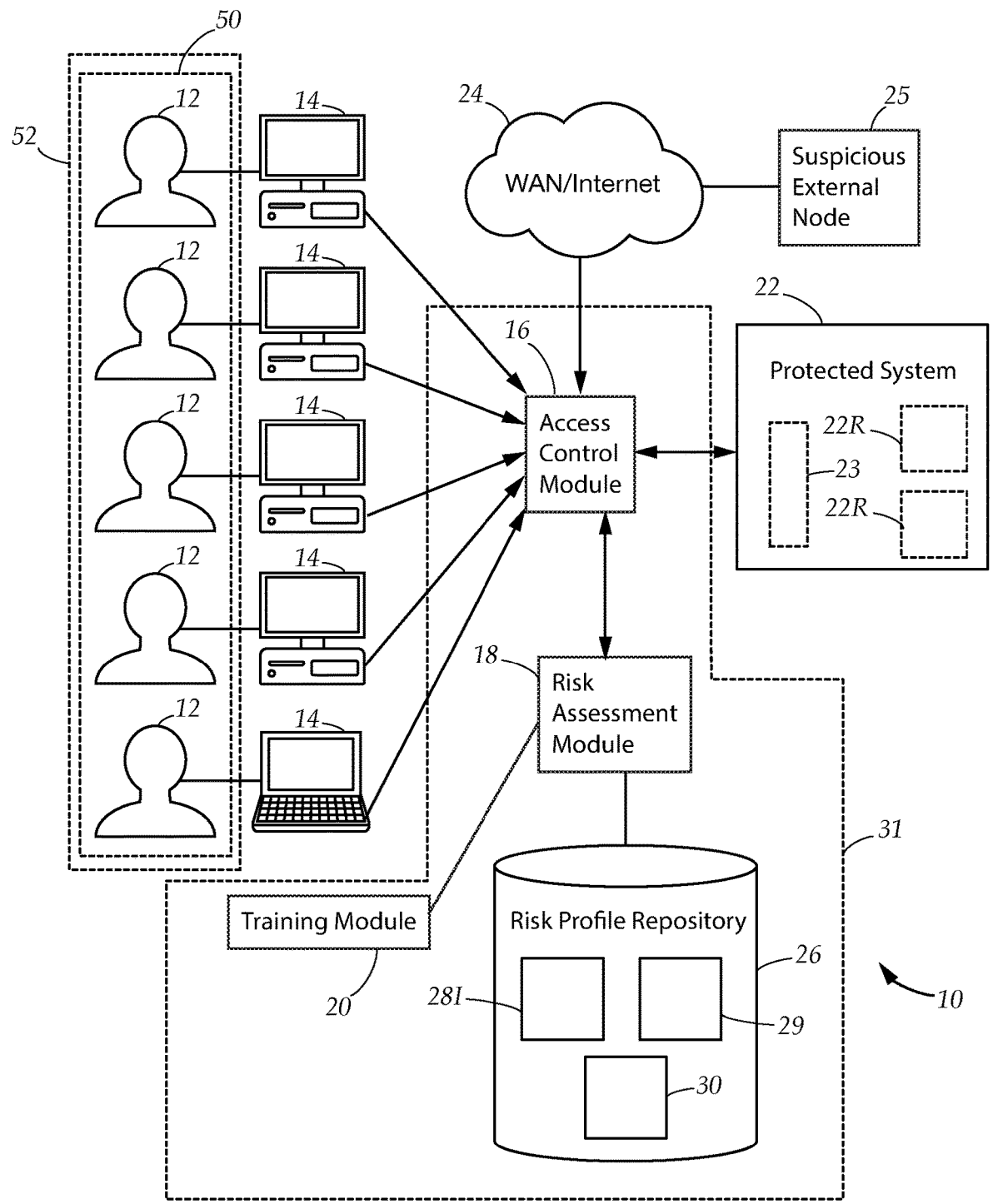
FIG. 1A is a block diagram depicting a cybersecurity system which identifies cybersecurity vulnerabilities and controls access by a plurality of users to a protected computer system, in accordance with an embodiment in the present disclosure.

FIG. 1A illustrates a cybersecurity system 10 adapted to assess, identify, and prevent cybersecurity vulnerabilities originating from a plurality of individual users 12 who are accessing, or seek to gain access to, a protected system 22. In a preferred embodiment, the individual users 12 may interact with and influence other individual users 12 within teams 50 of multiple individual users 12, while the individual users 12 and teams 50 may belong to an organization 52, such as a company, government agency, school, institution, or group of affiliated users having an organizational culture and an organizational cybersecurity policy which influences the cybersecurity behavior of each individual user 12 and team 50 within the organization 52. The cybersecurity system 10 comprises a risk assessment module 18 which employs a multi-level psychometric evaluation to identify cybersecurity vulnerabilities originating from the individual users 12, from the teams 50, or the organization 52 as a whole.

The risk assessment module 18 utilizes established psychometric tools and algorithms, social network analysis techniques, and organizational cultural assessments to generate a risk profile 28 for each individual user 12, team 50, or organization 52 using an individual, team, and organizational risk assessment respectively. These assessments quantify cybersecurity risk based on the cybersecurity vulnerabilities identified at the individual user 12, team 50, and organizational 52 levels, and generates an action recommendation to be carried out by the cybersecurity system 10 to mitigate or prevent the identified vulnerabilities. The risk profiles 28 may be stored within a risk profile repository 26 which is maintained and updated by the risk assessment module 18. The risk profile repository 26 also stores risk profiles for team risk 29 as well as organizational risk 30.

In one embodiment, the action recommendation generated for individual users 12 who are linked to high cybersecurity risk may cause such users to be denied access to the protected system 22 pending successful completion of a remedial cybersecurity training regime. The training progress associated with each individual user 12 may be stored as a training record 28C within the appropriate risk profile. The cybersecurity system 10 may further comprise a training module 20 which is adapted to carry out the remedial cybersecurity training regimes at the individual user 12, team 50, and organizational 52 levels. In one embodiment, the remedial cybersecurity training regimes may comprise lessons in the form of audio, video, and/or text which are designed to mitigate or prevent cybersecurity risk by educating and informing the individual users 12 about general cybersecurity practices as well as specific cybersecurity vulnerabilities which have been identified. In some embodiments, the training module 20 may be adapted to verify completion of the remedial cybersecurity training regimes by each individual user 12, through quizzes, monitoring, or other verification techniques as appropriate. The cybersecurity system 10 may also comprise an access control module 16 which grants, denies, or limits access by each individual user 12 or team 50 in accordance with the action recommendation generated for each individual user 12 or team 50.

Figure 1B:
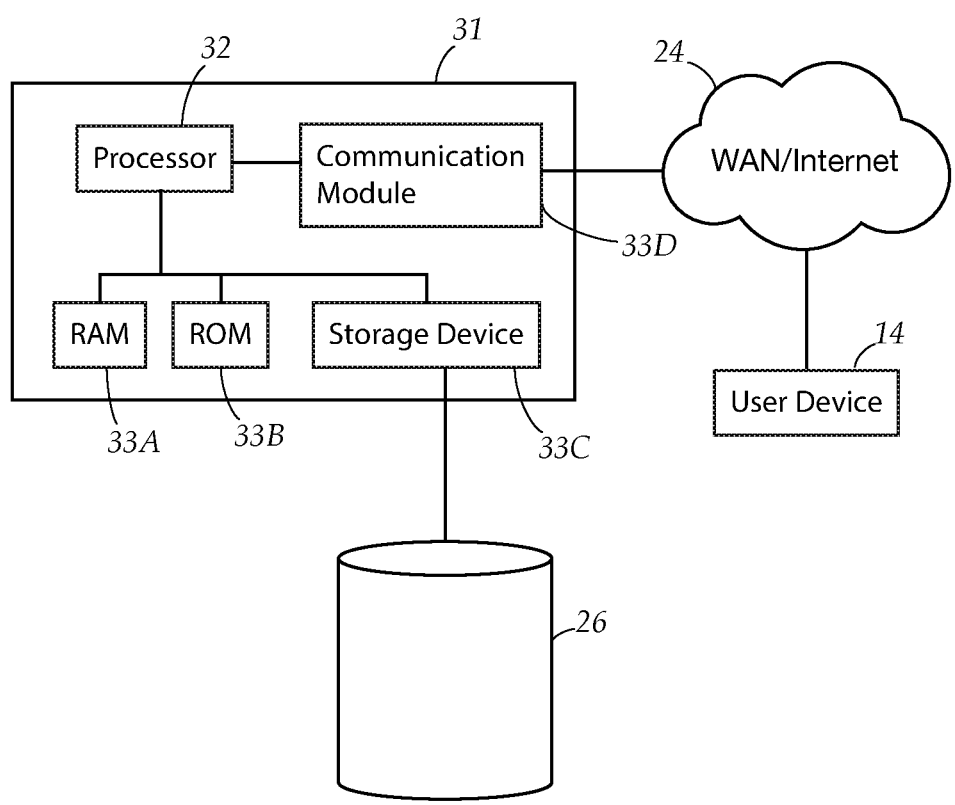
FIG. 1B is a block diagram depicting a control server, in accordance with an embodiment in the present disclosure.

Turning to FIG. 1B while continuing to refer to FIG. 1A, the cybersecurity system 10 comprises a control server 31. The control server 31 is a computing device capable of executing the risk assessment module 16, the training module 20, and the access control module 16, as software routines which perform the functions associated with each module. In one embodiment, the control server 31 comprises a processor 32, a RAM 33A, a ROM 33B, a storage device 33C for storing program code as well as the risk profile repository 26, and a communication module 33D adapted to transmit and receive data via a communication network 24, such as local area network, or the internet. In certain embodiments, the cybersecurity system 10 may be positioned remotely in relation to the protected system 22, such as through a cloud-based implementation. Alternatively, the control server 31 may be implemented using appropriate computer systems operated by the organization 50. As such, in one embodiment, the functions of the cybersecurity system 10 and the control server 31 may be executed by the protected system 22 itself.

Each individual user 12 has a user device 14, such as a personal computer, smartphone, tablet, or portable computing device, having a screen and which is capable of communicating with the protected system 20 or the cybersecurity system 10. The protected system 22 may be an individual computing device or a plurality of networked computing devices. For example, the protected system 22 may be a single personal computer, a series of computers connected to a small LAN, or a large corporate computer network spanning multiple locations, interconnected via internet. The protected system 22 may be linked to protected resources 22R, which represent sensitive files or databases, restricted functionality, or other computing resources or devices which must be protected to maintain the integrity of the protected system 22 or the interests of the organization 52. To aid the functionality of the cybersecurity system, the user device 14 may execute a risk assessment application 15 which is utilized to enforce access policies, execute training regimes, or execute other functions as appropriate.

In one embodiment, the access control module 16 may be implemented using software routines or a hardware device adapted to integrate with existing cybersecurity hardware or software, such as a firewall 23, which is employed by the protected system 22. The access control module 16 is therefore adapted to identify specific individual users 12 or teams 50, and communicate access permissions or restrictions to the protected system 22 applicable to said individual users 12 or teams 50. For example, the access permissions or restrictions may prevent an individual user 12 (via the user device 14) from accessing suspicious external nodes 25 such as suspicious websites, one or more protected resources 22R, the internet, or the protected system 22 itself.

Figure 2:
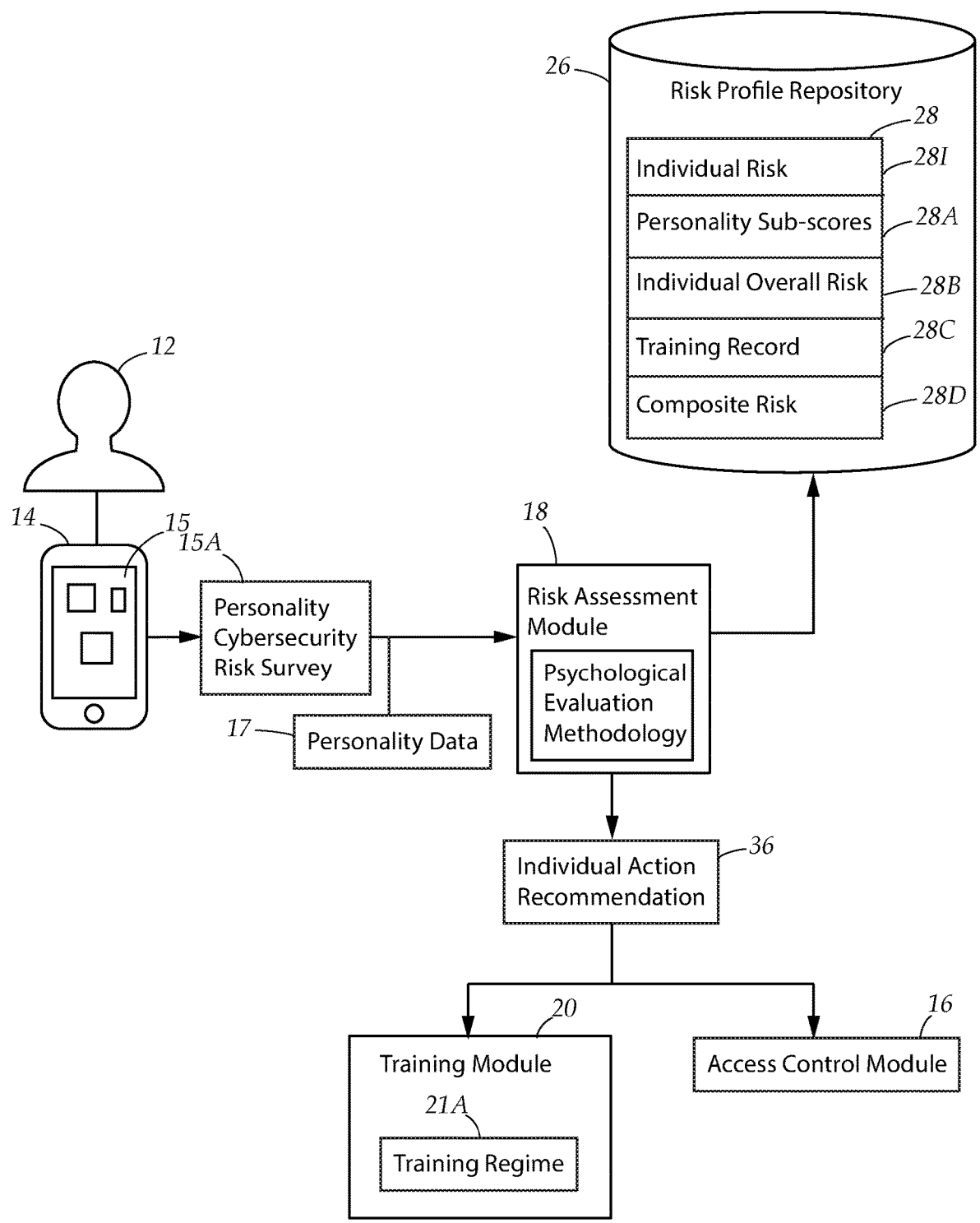
FIG. 2 is a block diagram depicting a risk assessment module performing an individual cybersecurity risk assessment in accordance with an embodiment in the present disclosure.
Figure 3A:
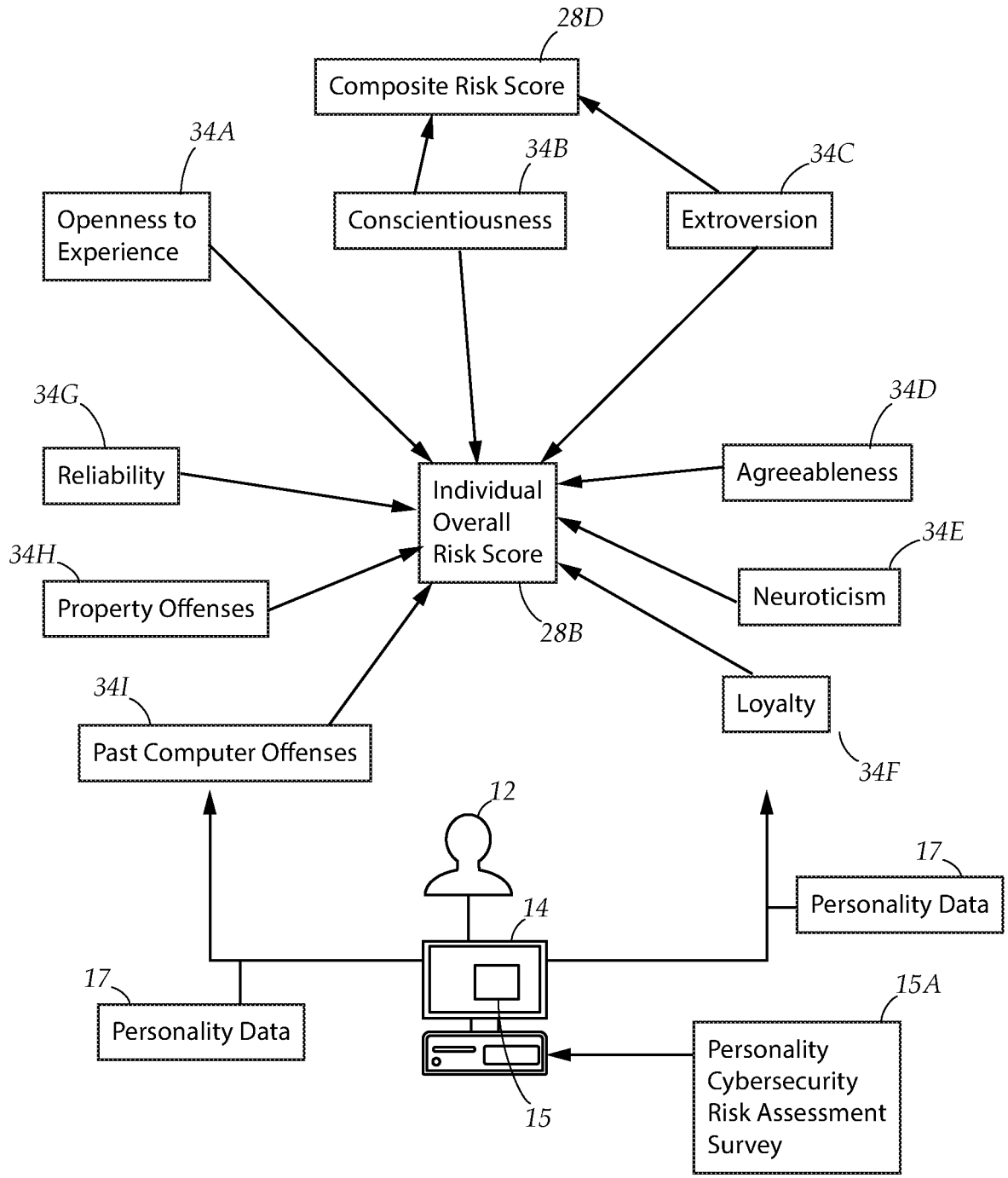
FIG. 3A is a block diagram depicting a plurality of personality traits which are assessed for each user to determine individual cybersecurity risk, in accordance with an embodiment in the present disclosure.

Turning now to FIG. 2, and FIGS. 3A-B while also referring to FIG. 1A, the evaluation begins by conducting an individual cybersecurity risk assessment for each individual user 12 using the risk assessment module 18. The individual cybersecurity risk evaluation utilizes proven psychometric algorithms for analyzing personality in order to determine the cybersecurity risk posed by each individual user 12, which will be apparent to a person of ordinary skill in the field of the invention. In a preferred embodiment, the individual cybersecurity risk for each user is determined by evaluating how strongly one or more relevant personality traits 34 are exhibited by each individual user 12. Each personality trait 34 may be associated with one or more cybersecurity vulnerabilities, or cybersecurity strengths. Cybersecurity vulnerabilities may be categorized as missteps or malfeasance. Missteps are actions or mistakes which unintentionally compromise the security of the protected system 22, while malfeasance corresponds to deliberate harmful or illegal acts, such as theft or computer crimes. Examples of missteps may include carelessness, disregard for correct cybersecurity rules and procedures, susceptibility to scams or phishing. The purpose of the individual risk assessment is to accurately identify the cybersecurity risk posed by each individual user 12 based on their personality traits 34, in order to allow the risk assessment module 10 to generate the appropriate individual action recommendation 36 to mitigate or prevent compromises to the security or integrity of the protected system 22.

In a preferred embodiment, each individual user 12 is presented with a personality cybersecurity assessment survey 15A administered via the user device 14 or other computing device. The personality cybersecurity assessment survey 15A comprises a plurality of questions structured to assess how strongly the individual user 12 exhibits each of the personality traits. Individual users 12 seeking to gain access to the protected system 22 for the first time may be required to complete the personality cybersecurity assessment survey 15A, and individual users 12 can be required to retake the survey periodically to reassess their individual cybersecurity risk. The results of the personality cybersecurity assessment survey 15A are used to determine a personality sub-score 28A for each personality trait 34. Each personality sub-score 28A may be represented as a numerical range or categorical rating arranged in increasing magnitude, which reflects how strongly the associated personality trait 34 is exhibited by the individual user 12. Although single personality traits 34 are linked to certain cybersecurity vulnerabilities, the personality sub-scores 28A may also be utilized to form one or more composite risk scores 28D, whereby the personality sub-scores 28A of multiple personality traits 34 are considered in combinations which can increase or decrease the likelihood that certain cybersecurity vulnerabilities will manifest.

In certain embodiments, the personality sub-scores 28A can be merged, summed, or aggregated to form a single individual overall risk score 28B, which can also be represented as a numerical range or as categorical ratings. For example, the individual overall risk score 28B can be described using the categorical ratings of low, medium, and high risk. The individual overall risk score 28B represents the overall cybersecurity risk posed by the individual user 12, while the composite risk score 28D represents a detailed, granular assessment of cybersecurity risk which allows specific cybersecurity vulnerabilities to be analyzed. The personality sub-scores 28A, composite risk score 28D, and individual overall risk score 28B form the individual risk profile 28I for each individual user 12.

In certain embodiments, personality traits 34 may be classified as either positive personality traits or negative personality traits. Each personality trait 34 constitutes a dimension, and the degree of cybersecurity risk associated with each dimension can be expressed as a dimensional risk score. The dimensional risk associated with negative personality traits is proportional to the relevant personality sub-score 28A, while the dimensional risk associated with positive personality traits is inversely proportional to the relevant personality sub-score 28A. In one embodiment, the dimensional risk scores for each of the personality traits 34 are added together to create a sum, which is then compared to numerical ranges or thresholds for each level of cybersecurity risk.

Referring to FIGS. 3A-B while also referring to FIGS. 1A and FIG. 2, in one embodiment, the personality traits may comprise Openness to Experience 34A, Conscientiousness 34B, Extroversion 34C, Agreeableness 34D, and Neuroticism 34E. These five personality traits are commonly known as the "Big Five" personality traits within extant psychological research. Note that other personality traits 34 linked to other proven psychological methodologies may be employed, as will be apparent to a person of ordinary skill in the art.

Openness to Experience 34A can be defined as an appreciation by a person for unusual ideas, imagination, curiosity, and variety of experience. Openness 34A can be considered to be a negative personality trait, as persons who strongly exhibit this personality trait are known to be more willing to engage in risky cybersecurity behavior.

Conscientiousness 34B is defined as a tendency for a person to display self-discipline, act dutifully, and strive for achievement against measures or outside expectations. Conscientiousness 34B is considered a positive personality trait, and individual users 12 with high personality sub-scores 28A are more likely to comply with cybersecurity policies, while individual users 12 with a low Conscientiousness 34B personality sub-score 28A are more likely to engage in missteps leading to an increase in cybersecurity vulnerability.

Extroversion 34C may be marked by pronounced engagement with the external world, enthusiasm, action-orientation, and high sociability. Extroversion 34C is considered a negative personality trait, and individual users 12 with a high Extroversion 34C personality sub-score are likely to violate cybersecurity protocols, such as by accidentally divulging protected information or communicating with strangers over the intern et, thus increasing cybersecurity vulnerability.

Agreeableness 34D is marked by a tendency to value getting along with other people. Agreeable persons are generally kind, generous, trustworthy, helpful, and are willing to place the interests of other people over their own interest. Agreeableness 34D is considered a negative personality trait, as individual users 12 with a high Agreeableness 34D personality sub-score are more likely to trust others and succumb to social engineering or phishing scams, thus increasing cybersecurity vulnerability.

Neuroticism 34E is the tendency to experience negative emotions, such as anger, anxiety, or depression. Neuroticism 34E can also be described as emotional instability. In certain situations, Neuroticism 34E can be considered to be a negative personality trait, with individual users 12 having high Neuroticism 34E personality sub-scores 28A being less likely to exercise proper cybersecurity protocols, thus leading to an increase in cybersecurity vulnerability.

In addition to the "Big Five", additional personality traits 34 may be used to further refine the individual cybersecurity risk assessment. In one embodiment, these additional personality traits include Loyalty 34F, Reliability 34G, Property Offenses 34H, and Past Computer Offenses 34I.

Loyalty 34F corresponds to commitment and devotion to the organization (such as a company), its leadership and members, and its financial or reputational success. Loyalty is considered a positive personality trait, with highly loyal users being more likely to support the organization and its goals.

Reliability 34G corresponds to trustworthiness and the tendency to act in a rule-abiding manner which furthers the interests of the organization, its members, and customers/clients, where applicable. Reliability is a positive personality trait. However, an unreliable individual user 12 with a low reliability personality sub-score 28A is likely to ignore established cybersecurity practices.

Property Offenses 34H describes whether a person is likely to distinguish between their personal property, and the property of the organization. Property Offenses 34H can be considered a negative personality trait, with persons having a high personality sub-score in this trait being more likely to misappropriate or misuse the property of the organization.

Past Computer Offenses 34I describe a person's attitudes towards the protection of computer equipment and the integrity of computer systems. Past Computer Offenses 34I is a negative personality trait, and a high Past Computer Offenses 34I personality sub-score is likely to repeat past cybersecurity mistakes or missteps.

In addition to considering personality sub-scores 28A related to single personality traits 34, the psychological evaluation methodology may utilize composite risk scores 28D to identify cybersecurity strengths or cybersecurity vulnerabilities that arise from a combination of personality sub-scores 28A, which may reduce or increase the cybersecurity risk posed by the individual user 12. For example, if an individual user 12 has a high Extroversion 34C personality sub-score 28A and a low Conscientiousness 34B personality sub-score 28A, the individual user 12 is more likely to engage in risky online behavior, such as clicking suspicious links and falling victim to phishing attacks. In certain instances, positive personality traits may offset negative personality traits, thus decreasing the likelihood that the associated cybersecurity vulnerabilities will be manifested. For example, the composite risk score 28D may reflect that a high Conscientiousness 34B personality sub-score 28A offsets a high Extroversion 34C personality sub-score 28D. Another set of personality traits which may be used to form a composite risk score 28D are the traits of Loyalty 34F, Reliability 34G, Property Offenses 34H, and Past Computer Offenses 34I. The negative personality traits for Property Offenses 34H and Past Computer Offenses 34I are highly pertinent in predicting whether an individual user 12 will manifest cybersecurity mis-steps or malfeasance. If the individual user 12 has low personality sub-scores in the positive personality traits of Loyalty 34F and Reliability 34G, the cybersecurity risk posed by the user greatly increases as the disloyal and unreliable user becomes far more likely to manifest mis-steps or malfeasance. On the other hand, high personality sub-scores 28A in the positive personality traits of Loyalty 34F and Reliability 34G may indicate that the individual user 12 is likely to attempt in good faith to engage in good cybersecurity practices, thus somewhat reducing the degree of cybersecurity risk. Such a user may benefit from remedial cybersecurity training.

Figure 3C:
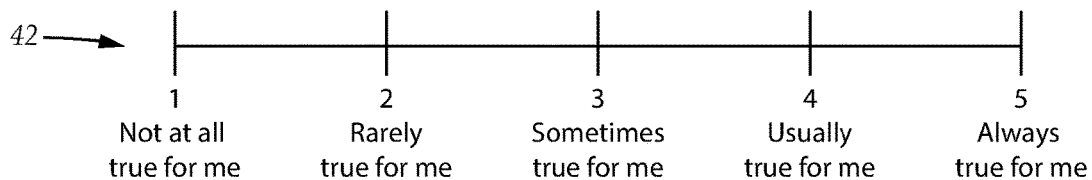
FIG. 3C is a block diagram depicting sample questions utilized in an example individual risk assessment survey, in accordance with an embodiment in the present disclosure.
Figure 3C:
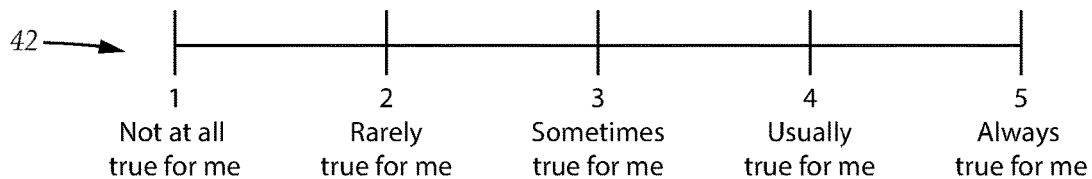
Figure 3C:
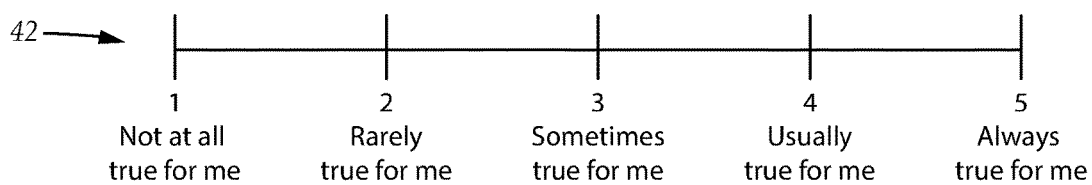
Figure 3C:
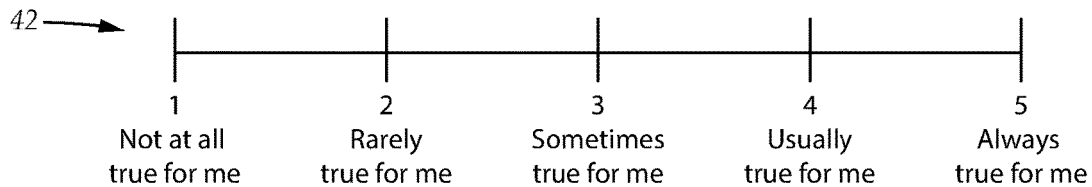

Turning to FIG. 3C while also referring to FIG. 1A, FIG. 2, and FIGS. 3A-B, several example personality survey questions 19P from the personality cybersecurity assessment survey 15A are shown. In one embodiment, each personality survey question 19P is presented to the individual user 12 as a statement which exemplifies one of the personality traits 34. Each personality survey question 19P is accompanied by a plurality of responses 42 which indicate how strongly the individual user 12 agrees or disagrees with the statement. The degree of the agreement or disagreement as indicated by the response is utilized to determine the personality sub-score 28A for each personality trait. For example, in one embodiment, if the individual user 12 selects a response 42 indicating maximum agreement with the statement, five points are added to the personality sub-score, while a response indicating maximum disagreement adds one point to the personality sub-score. Intermediate responses earn two, three, or four points. Certain statements describe a characteristic or sentiment which are contrary to the associated personality trait, and responses 42 are scored in reverse, where maximum disagreement earns five points towards the personality sub-score and maximum agreement earns 1 point.

Referring to FIG. 3B while also referring to FIG. 1A, FIG. 2, and FIG. 3A, an example risk profile 28 is shown for each of three individual users 12—"User A" 12A, "User B" 12B, and "User C" 12C. In the present example, "User A" 12A, "User B" 12B, and "User C" 12C have an individual overall risk rating 28B of "High", "Medium", and "Low" respectively, generated after considering the personality sub-scores 28A for each of the personality traits 34. The personality sub-scores 28A may have a range of numerical values from "1" to "100", with an associated dimensional risk determined by whether the personality trait is positive or negative. The personality sub-scores 28A of "User A" 12B indicate that the negative personality traits of Openness to Experience 34A, Extroversion 34C, Agreeableness 34D, and Past Computer Offenses 34I are strongly exhibited, while the positive personality traits of Conscientiousness 34B, Loyalty 34F and Reliability 34G are very weakly exhibited. The individual overall risk rating 28B of "User A" 12A indicates that this user is highly likely to compromise the security of the protected system 22. The risk profile 28 of "User A" 12A may also be used to generate a composite risk score 28D based on the combination of the personality sub-scores 28A of Conscientiousness 34B and Extroversion 34C. "User A" exhibits high dimensional risk in both of these personality traits, and is thus at high risk of manifesting cybersecurity vulnerabilities associated with risky online behavior. The individual risk profile 28I may also include a composite risk score 28D based on the personality traits of Loyalty 34F, Reliability 34G, Property 34H, and Past Computer Offenses 34I. The personality sub-scores 28A of "User A" reflect high dimensional risk for each of these personality traits, indicating that the "User A" may be highly likely to manifest cybersecurity vulnerabilities in the form of missteps or even malfeasance. Based on the individual overall risk rating 28B and the composite risk score 28D, the risk assessment module 18 may determine the cybersecurity risk associated with "User A" 12A is too great, and generate an individual action recommendation 36 which denies access by "User A" 12A to the protected system 22.

In the present example, the personality sub-scores of "User B" 12B generally fall into the middle of the numerical range. A composite risk score 28D based on the Conscientiousness 34B and Extroversion 34C personality sub-scores 28A suggests a moderate degree of elevated risk based on the dimensional risk associated with each of these personality traits. A composite risk score 28D based on the Loyalty 34F, Reliability 34G, Property Offenses 34H, and Past Computer Offenses 34I personality sub-scores 28A also suggests a moderate degree of elevated cybersecurity risk based on the increased dimensional risk associated with the Property Offenses 34H and Past Computer Offenses 34I personality traits. The risk assessment module 18 determines that the individual overall risk 28B of "User B" 12B is "Medium Risk". The individual action recommendation 36 generated for "User B" 12B may indicate that the user will be granted access to the protected system 22 pending the successful completion of the individual remedial cybersecurity training regime 21.

"User C" 12C has personality sub-scores 28A which are generally high for the positive personality traits, and low for the negative personality traits. The individual overall risk score 28B for "User C" 12C may fall under the "Low Risk" category. The composite risk score 28D based on the high Conscientiousness 34B and medium Extroversion 34C personality sub-scores 28A suggest a lowered cybersecurity risk. Similarly, the composite risk score 28D based on the Loyalty 34F, Reliability 34G, Property Offenses 34H, and Past Computer Offenses 34I personality sub-scores 28A suggests a lowered cybersecurity risk based on the low dimensional risk associated with each of these personality traits 34. Based on the low individual overall risk score 28B and the composite risk scores 28D, the risk assessment module 18 generates an individual action recommendation 36 which allows "User C" 12C to access the protected system 22, and may further require minimal remedial cybersecurity training.

Referring to FIG. 3D while also referring to FIG. 1A, FIG. 2, and FIGS. 3A-B, an exemplary list 44 of cybersecurity vulnerabilities and their associated personality traits 34 is shown. Once the individual cybersecurity risk assessment for each individual user 12 is completed, the risk assessment module 18 may utilize the risk profile 28 to customize the individual action recommendation 36 to address the identified cybersecurity vulnerabilities. The training module 20 may assign remedial cybersecurity training to the individual user 12 which addresses the specific cybersecurity vulnerabilities associated with the user's risk profile 28. For example, if the individual user 12 has a low Conscientiousness personality trait sub-score, the remedial cybersecurity training regime assigned to the individual user 12 may address any cybersecurity vulnerability which is linked either wholly or in part which is associated with high dimensional risk in the Conscientiousness 34B personality trait. Similarly, the individual action recommendation 36 may also cause the access control module 16 to restrict access by the individual user 12 to the protected system 22 or protected resources 22R that are at risk due to the identified cybersecurity vulnerabilities. Note that the list 44 of cybersecurity vulnerabilities is provided for illustrative purposes and does not constitute a complete list of cybersecurity vulnerabilities. Furthermore, the specific personality traits 34 that increase likelihood that the cybersecurity vulnerabilities will manifest are not intended to be limiting, and will vary depending on the psychological methodologies or personality theories which are employed.

Figure 3E:
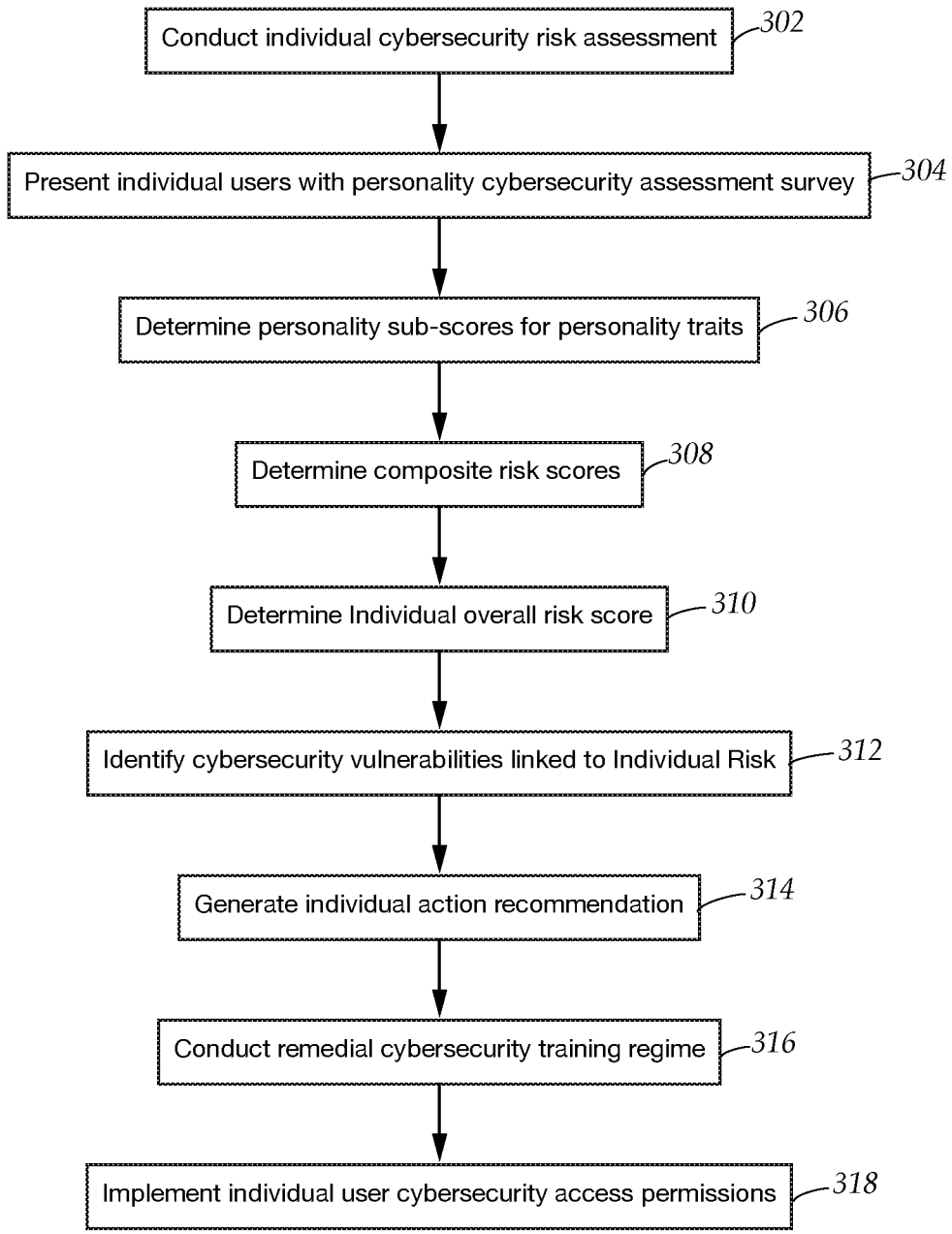
FIG. 3E is a flowchart depicting an example individual cybersecurity risk assessment process, in accordance with an embodiment in the present disclosure.

Turning now to FIG. 3E, while also referring to FIG. 1A, and FIGS. 3A-B, an exemplary individual cybersecurity risk assessment process 300 is shown, which summarizes the features described above. The process 300 begins at step 302, with the initialization of the individual cybersecurity risk assessment. At step 304, the individual user 12 is presented with the personality cybersecurity assessment survey 15A. At step 304, the results of the survey 15A are collected as personality data 17 by the risk assessment module 18. At step 306, the personality data 17 is used to determine a personality sub-score 28A for each of the personality traits 34. Next, at step 308, composite risk scores 28D are determined using a combination of two or more personality sub-scores 28A, and the various personality sub-scores 28A are considered in combination to produce an individual overall risk score 28B. At step 312, the risk assessment module 18 identifies cybersecurity vulnerabilities linked to personality sub-scores 28, as well as those cybersecurity vulnerabilities linked to composite risk scores 28D. At step 314, the risk assessment module 18 generates an individual action recommendation 36 for mitigating the identified cybersecurity vulnerabilities, in proportion with the magnitude of the individual overall risk score 28B and/or the personality sub-scores and the composite risk scores 28D. Next, at step 316, the training module 20 implements any individual training regimes 21 specified in the individual action recommendation 36, and the access control module 16 implements any access restrictions or permissions in accordance with the individual action recommendation 36.

In certain embodiments, the individual cybersecurity risk assessment also considers the career life cycle stage of each individual user 12 when determining potential cybersecurity vulnerabilities. For example, individual users 12 at the early, middle, or late stage of their careers are likely to encounter different problems, and will require appropriate intervention. For example, individual users 12 at the early career life cycle stage may have inadequate skills, or un realistic attitudes or expectations. The middle career life cycle stage may be characterized by stalled career progress, or financial or life concerns. The late career life cycle stage may be characterized by life-style pressures and insecurity, or a mismatch of talents to their work.

Figure 4A:
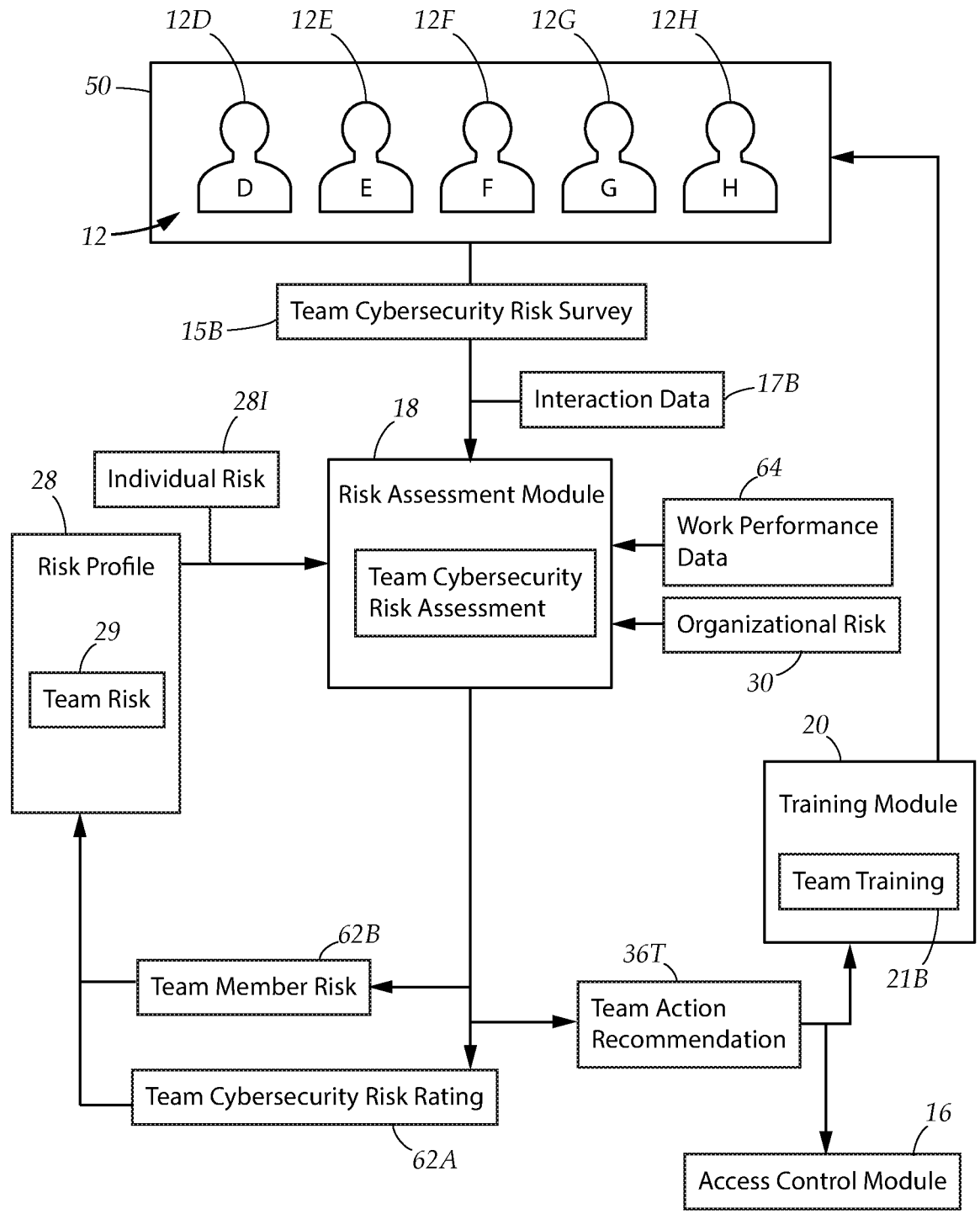
FIG. 4A is a block diagram depicting the risk assessment module employing a team cybersecurity risk assessment to determine team risk, in accordance with an embodiment in the present disclosure.
Figures 4B, 4C:
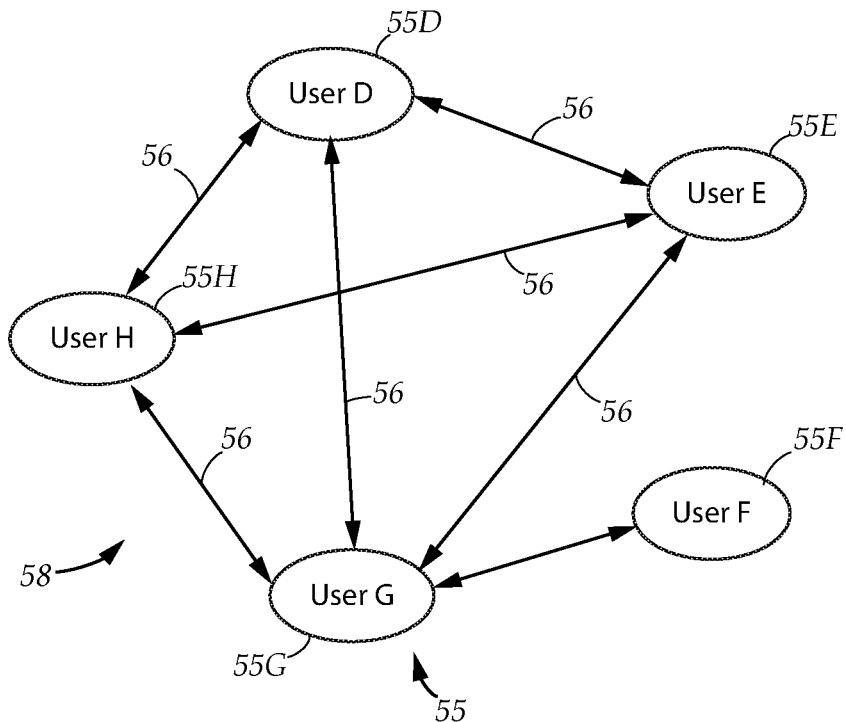
FIG. 4B is a block diagram depicting a network map for social network analysis, in accordance with an embodiment in the present disclosure.
FIG. 4C is a table showing team risk for a plurality of team members, in accordance with an embodiment in the present disclosure.
Figure 4D:
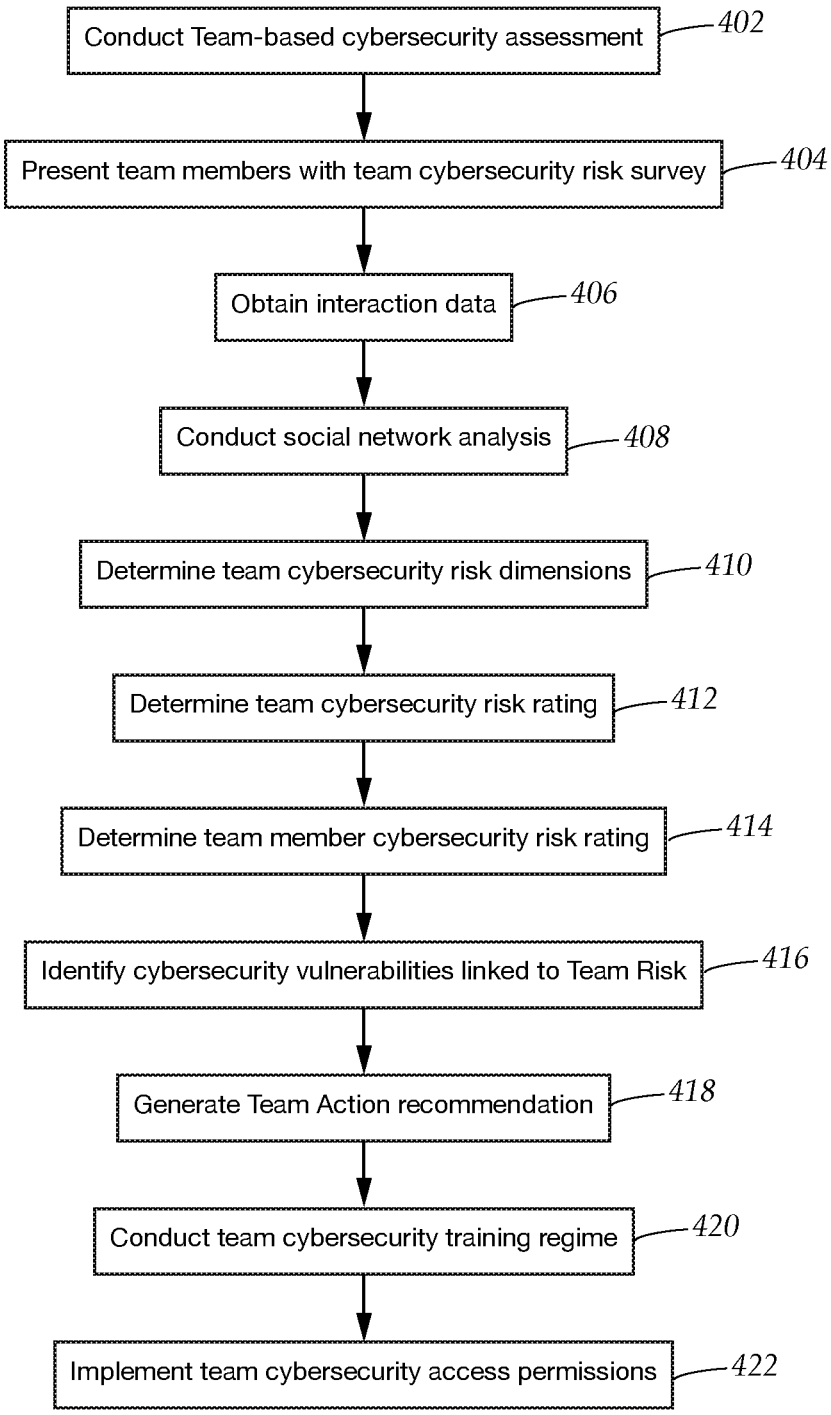
FIG. 4D is a flowchart depicting an example team cybersecurity assessment process, in accordance with an embodiment in the present disclosure.

Turning now to FIGS. 4A-B while also referring to FIG. 1A, the risk assessment module 18 is adapted to determine the cybersecurity risk exhibited by each team 50 and its team members, using a team-based cybersecurity risk assessment. The team-based cybersecurity risk assessment evaluates relationships between team members within a team 50, who are individual users 12, in order to identify cybersecurity vulnerabilities related to the characteristics of the team 50 as a whole, as well as those cybersecurity vulnerabilities which may be manifested by the individual users 12 in their role as team members. Team-based cybersecurity risk may therefore be expressed as a combination of a team cybersecurity risk rating 62A, and a team member cybersecurity risk rating 62B. The team cybersecurity risk rating 62A and the team member cybersecurity risk ratings 62B may be interrelated, as certain combinations of characteristics of the team and the team members may magnify or mitigate cybersecurity risk.

In a preferred embodiment, the team-based cybersecurity risk assessment utilizes social network analysis (SNA) techniques to map and quantify relationships between team members. The SNA is conducted using a network map 58 comprising a plurality of nodes 55, and each node 55 represents an individual user 12 or team member. A relationship between two team members is represented using a path 56 which forms a connection between their respective nodes 55. Each relationship may be quantified by measuring interactions which occur between the team members, including social interactions and work-related interactions, in the form of interaction data 17B. The interaction data 17B may further be analyzed using interaction metrics, such as frequency, importance, quality, or other factors as appropriate. By mapping the interactions between the team members, the SNA may therefore determine the relative closeness and coordination exhibited by the team 50 as a whole. The team member cybersecurity risk score of each team member is determined as a result of their interactions within the team 50, with the potential inclusion of other metrics, such as work performance data 64. Individual risk 281, as well as organizational risk 30, may also be utilized. The team cybersecurity risk rating 62A of the team as a whole may be dependent on the risk associated with its team members, as high closeness and coordination exhibited by the team 50 may magnify the potential effects of cybersecurity vulnerabilities manifested by its team members.

The interaction data 17B can be gathered using a variety of techniques, such as via automated tools which track electronic communications and computer activity, as well as surveys directed towards the individual users 12. In a preferred embodiment, each individual user 12 is presented with a team-based risk assessment survey 15B comprising questions which determine which other team members each individual user 12 has interacted with, as well as questions which are used to determine the appropriate interaction metrics which describe the nature of the interactions. For example, the questions may further determine how many times the individual user 12 interacted with each team member over a certain period of time. The questions may also determine the quality of the interactions, such as by asking whether the interactions contributed towards team goals or work product, as well as the importance of those contributions or interactions. The quality of interactions may depend on whether interactions are positive or negative.

In one embodiment, the risk assessment module 18 quantifies the results of the team-based cybersecurity risk survey 15B using a plurality of team cybersecurity risk dimensions. The dimensions may include Degree Centrality, Betweenness Centrality, Closeness Centrality, and Network Centralization. The dimensions which reflect centrality are used to determine the closeness and coordination of the team 50, while network centralization determines the resiliency of the team 50.

Degree Centrality is a measure of overall network activity which a node 55 produces within the network map 58. For example, degree centrality increases with the number of connections each node 55 has with other nodes 55.

Betweenness Centrality pertains to the number of potential connections available to a node 55, and reflects a team member's ability to facilitate or restrict the flow of information, influence, or ideas through the network. For example, inadvertent cybersecurity lapses within a team may be caused by the restriction of pertinent cybersecurity information within a network with nodes exhibiting low betweenness centrality. Conversely, a node 55 with high betweenness centrality is potentially able to propagate bad cybersecurity practices throughout the network.

Closeness Centrality measures the degree of regular access that one node 55 may have to another node 55. For example, a node 55 exhibiting high closeness centrality may have direct access along a path 56 to many other nodes 55 within the network. A node 55 with low closeness centrality may be directly connected to few nodes 55, thus relying on indirect access through one or more intervening nodes 55.

Network centralization measures whether a network is dominated by either one or very few highly central nodes 55. Central nodes 55 in networks with high network centralization are potential points of failure, whereby the loss, failure, or compromise of one of these central nodes 55 removes key paths 56, which interrupts the flow of information or communications between the remaining nodes 55. In a network where one of the central nodes 55 is linked to a team member who exhibits high levels of individual risk 281, the team 50 is highly vulnerable to disruption due to attacks, missteps, or malfeasance. Conversely, networks with low network centralization are more resilient, as the removal of a small number of nodes 55 does not lead to the failure of the network.

In one embodiment, once the network map 58 has been generated from the interaction data 17B, the risk assessment module 18 determines the team member risk rating 62B for each team member by considering the Centrality dimensions along with any interaction metrics. In general, team members who are isolated from their teams and whose interactions are characterized as poor and/or negative are linked to high cybersecurity risk. These poorly performing team members tend to be disgruntled or dissatisfied, and are likely to manifest acts of malfeasance or other cybersecurity vulnerabilities linked to antisocial behavior. In contrast, highly connected team members whose interactions are highly valued and/or positive tend to be the most productive team members, and are not likely to manifest cybersecurity vulnerabilities in the context of the team-based cybersecurity risk assessment. Note that the team member cybersecurity risk rating produced by the team-based cybersecurity risk assessment, when taken as an independent process, does not replace the individual cybersecurity risk assessment, as an individual user's performance within a team does not necessarily offset the cybersecurity risk posed by the user's personality traits.

Referring to FIGS. 4A-4D along with FIG. 1A, an example team 50 is shown, with five team members: "User D" 12D, "User E" 12E, "User F" 12F, "User G" 12G, and "User H" 12H. An example team-based cybersecurity risk assessment process 400 is also depicted, which begins at step 402 with the identification of each team member within the team 50. In the present example, "User D" 12D is the team leader, while "User E" 12E and "User F" 12F are developers. "User G" 12G is a consultant, and "User H" 12H is the administrative assistant for the team 50.

Next, at step 402, each of the team members is presented with the team cybersecurity risk survey 15B. At step 404, the results of the survey 15B are submitted to the risk assessment module 18 to form the interaction data 17B. At step 408, social network analysis is employed to generate the network map 58. Each of these team members are represented on the network map 58 by nodes 55D-55H respectively, and each of the nodes 55 are linked to the other nodes 55 by paths 56 representing interactions.

At step 410, each team member is rated according to the team cybersecurity risk dimensions of degree centrality, betweenness centrality, and closeness centrality, and any interaction metrics are considered. Next, at steps 412 and 414, risk assessment module 18 determines the team cybersecurity risk rating 62A and the team member cybersecurity risk rating 62B, which respectively describe the levels of cybersecurity risk posed by the team 50 as a whole and by each team member. The team cybersecurity risk rating 62A and the team member cybersecurity risk rating 62B can be interdependent. For example, part of the risk posed by the team as a whole is determined by the characteristics of the team as revealed by the social network analysis. In turn, the characteristics of the team partially determine the level of risk posed by each team member. Lastly, the level of risk posed by the team members can reduce or increase the benefits or risks inherent in the characteristics of the team as a whole.

The team cybersecurity risk dimensions are considered along with interaction metrics, to produce a team risk score 61 for each team member. Team risk scores 61 may then be categorized using a team member risk rating 62B. In one embodiment, the team member risk ratings 62B may be represented by the ascending categories of "Low", "Medium", "High", and "Critical".

In the present example, the team risk score 61 may be represented using a numerical range from "1" to "20", with "1" representing the highest risk and "20" representing the lowest risk. "User D" 12D has a team risk score 61 of "5", corresponding to a team member risk rating of "High" 62B. "User D" interacts with several of the other team members, but the frequency of these interactions is low, and the interaction metrics indicate these interactions contribute little to the goals of the team 50. "User G" 12G, on the other hand, interacts regularly with all of the other team members and rates high in all relevant team cybersecurity risk dimensions. Furthermore, the interactions of "User G" 12G are highly valued according to the interaction metrics, as "User G" 12G makes critical contributions towards the team's goals. Accordingly, "User G" 12G has a team risk score of "15", which corresponds to the team member risk rating 62B of "Low". On the other hand, "User F" 12F directly interacts with only one team member, and the interactions are infrequent and of low quality. The team risk score 61 of "User F" 12F is "2", corresponding to a team member cybersecurity risk rating 62B of "Critical".

The team cybersecurity risk rating 62A may be calculated using various methods as will be apparent to a person of ordinary skill in the art in the field of the invention. For example, the team cybersecurity risk rating 62A may be calculated by aggregating, averaging, or adding together the team risk scores 61 of the team members, with consideration given to risk associated with network centralization as well as other dimensions or risk factors. The network centralization of the example team 50 can be considered to be high, as node 55G associated with "User G" 12G forms a dominant central node which is crucial to the operation of the team 50. This can be a negative factor which increases the team cybersecurity risk rating 62A. In the present example, based on the team risk scores 61 and the network centralization of the team 50, the team cybersecurity risk rating 62A can be categorized as "Medium".

In certain embodiments, the individual cybersecurity risk 281 exhibited by each team member may be incorporated into the team cybersecurity risk assessment. For example, the risk profile 28 of "User G" 12G as contained in the risk profile repository 26, may indicate that the user exhibits a high level of cybersecurity risk due to the user's personality traits, in spite of the user's excellent work performance 64 and low team member cybersecurity risk rating 62B. As "User G" 12G exhibits high betweenness centrality, the user is in a position to inadvertently propagate poor cybersecurity practices. As a result, the team cybersecurity risk rating 62A may be increased to "High", based on a combination of the individual risk 281 and high betweenness centrality exhibited by "User G" 12G, and the high network centralization of the team 50, with "User G" 12G representing a dominant central node 55. In certain embodiments, where team members lack an existing individual risk score, the risk assessment module 18 may create a team action recommendation 36T that an individual cybersecurity risk assessment be carried out for any such team member who exhibits high betweenness centrality or who is associated with one of the points of failure due to high network centralization.

Next, at step 416, cybersecurity vulnerabilities which are related to the team cybersecurity risk rating 62A and the team member cybersecurity risk rating 26B are identified by the risk assessment module 18. For example, some of the potential cybersecurity vulnerabilities include the possibility for malfeasance by "User F" 12G, as well as the susceptibility of "User G" 12G to malicious attacks and cybersecurity missteps. At step 418, the risk assessment module 18 generates a team action recommendation 36T to reduce the team cybersecurity risk rating 62A and mitigate or prevent the identified cybersecurity vulnerabilities. For example, the activities of "User F" 12F may be subjected to increased monitoring, while network administrators may be alerted to reduce the network centralization of the team 50. Other risk mitigation or prevention actions could correspond to a reduction in the isolation of team members with a "high" team member cybersecurity risk rating 62B, or the removal of team members with a "critical" team member cybersecurity risk rating 62B from the team itself. A "critical" team member cybersecurity risk rating 62B may also prompt the risk assessment module to recommend that a forensic review be carried out to identify possible acts of malfeasance which may have been committed. The team action recommendation 36T may also specify a team remedial cybersecurity training regime 21B, to be implemented at step 420. For example, "User G" 12G (as well as the other team members)

may be presented with remedial training which seeks to educate the user on how to ensure proper cybersecurity practices are observed by the team. Lastly, at step 422, any access restrictions or permissions set forth in the team action recommendation 36T may be carried out by the access control module 16.

Figure 5A:
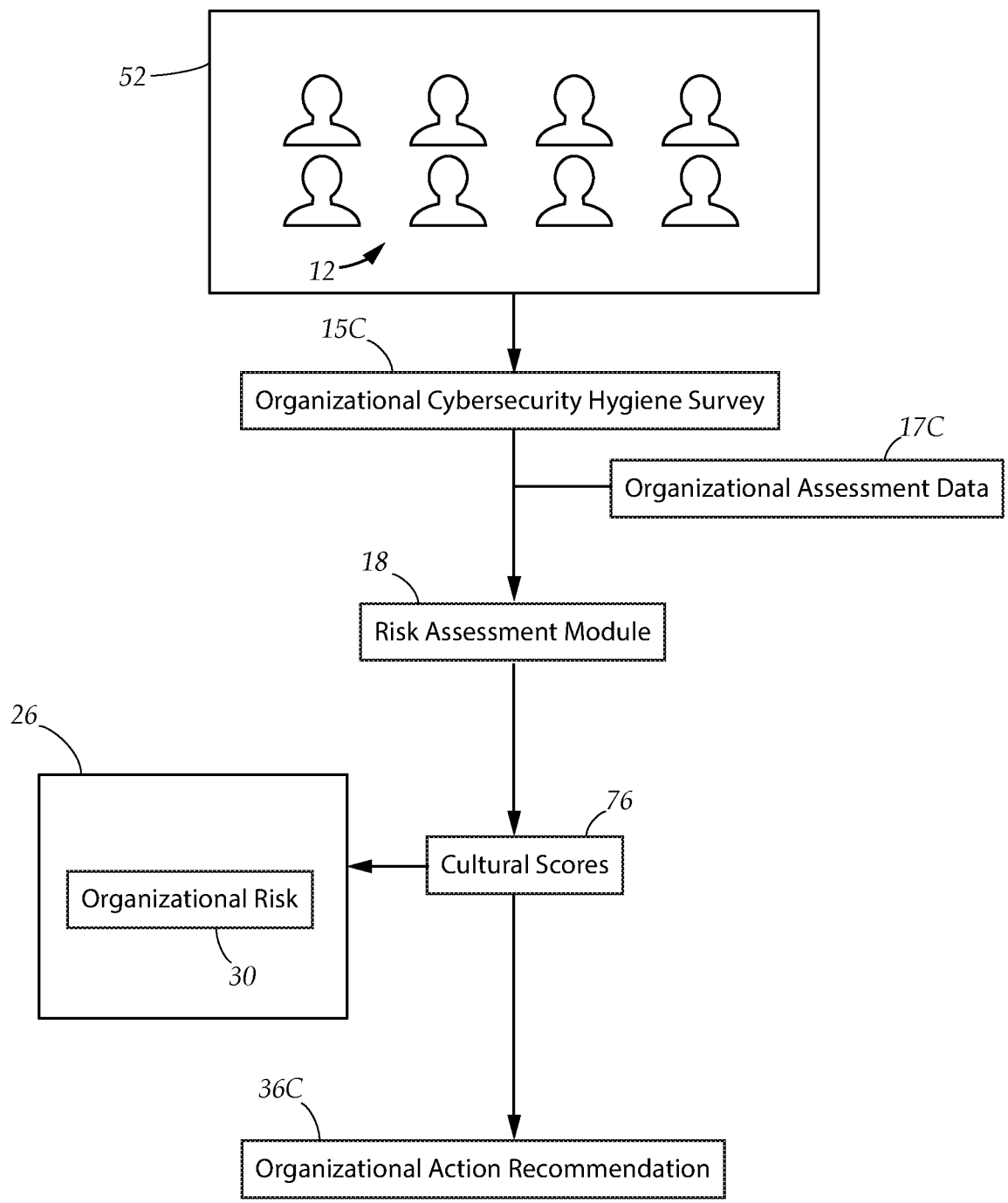
FIG. 5A is a block diagram depicting the risk assessment module conducting an organizational risk assessment, in accordance with an embodiment in the present disclosure.

Turning now to FIGS. 5A-B while also referring to FIG. 1A, the level of cybersecurity risk associated with the organization 52 may be determined through an organization cybersecurity risk assessment carried out by the risk assessment module 18. Organizational risk 30 measures how the culture of the organization 52 can positively or negatively influence cybersecurity behaviors by the individual users 12 constituting its members. The culture of the organization 52 is assessed using one or more cultural traits 70, and the organizational risk 30 is determined based on how each cultural trait, or a combination of cultural traits, affects cybersecurity behavior within the organization 52. Generally, organization s with effective cultures are more likely to identify, react to, and prevent cybersecurity threats.

In one embodiment, the cultural traits 70 may include Mission, Consistency, Adaptability, and Involvement. The Mission trait may describe how the organization 52 plans and determines its goals. The Consistency trait may describe how effectively the organization 52 can achieve its goals. The Adaptability trait may describe how well the organization reacts to changing conditions, and the Involvement trait may describe how effectively the organization utilizes its members.

Each cultural trait 70 may also be divided into several focus areas 74 which examine the cultural trait 70 in greater detail. For example, the Mission trait 70 may include the focus areas 74 of Strategic Direction and Intent, Goals and Objectives, and Vision. The Consistency trait 70 may include the focus areas 74 of Coordination and Integration, Agreement, and Core Values. The Adaptability trait 70 may include the focus areas 74 of Creating Change, Customer Focus, and Organizational Learning. The Involvement trait 70 may include the focus areas 74 of Capability Development, Team Orientation, and Empowerment.

Figure 5C:
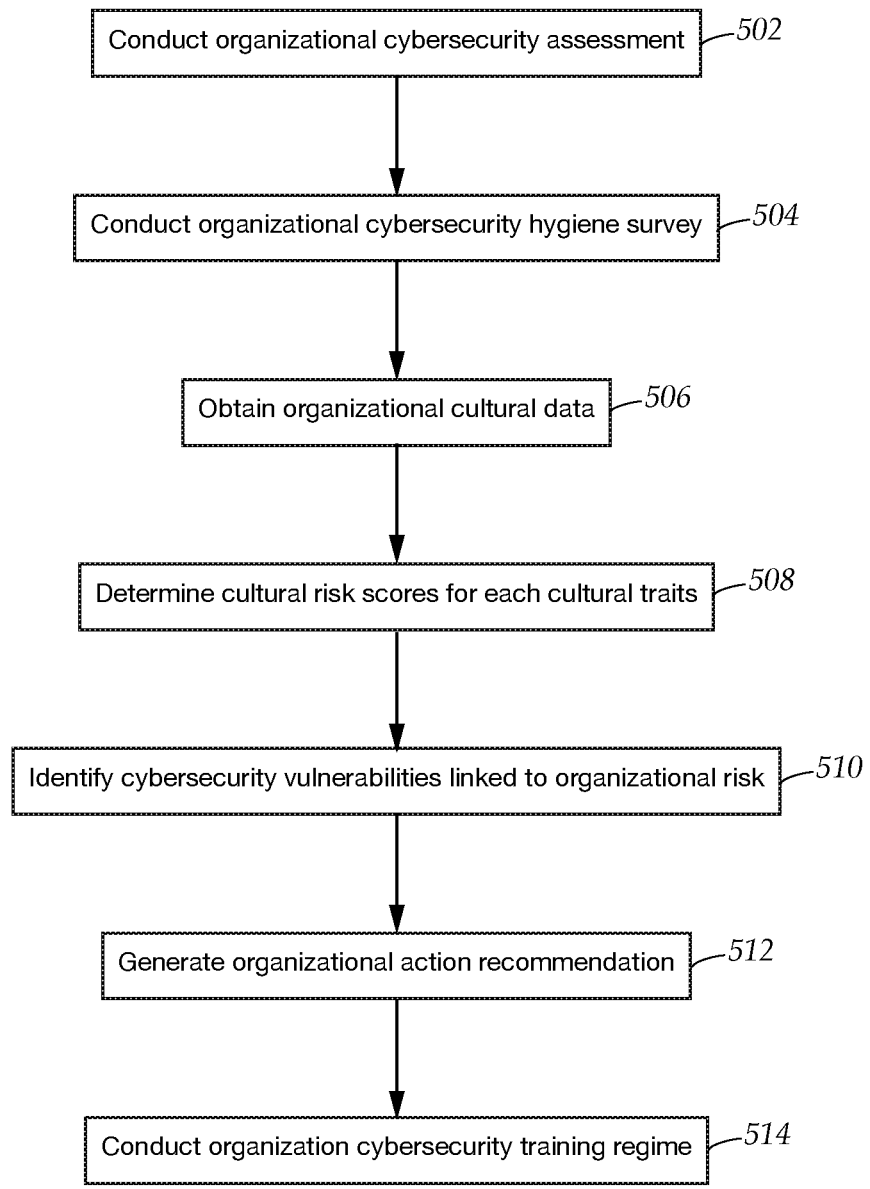
FIG. 5C is a flowchart depicting an example organizational risk assessment process, in accordance with an embodiment in the present disclosure.

Referring to FIG. 5C while also referring to FIG. 1A and FIGS. 5A-B, an example organizational risk assessment process 500 is shown. The process 500 begins at step 502, when the organizational risk assessment is begun. In a preferred embodiment, the organizational risk assessment is carried out using an organizational cybersecurity hygiene survey 15C, which is presented at step 504 to each of the individual users 12 who constitute the members of the organization 52. The organizational cybersecurity hygiene survey 15C may be implemented using the user devices 14 of each of the members, and comprises a series of questions which are designed to determine how strongly the organization exhibits each of the cultural traits 70. Each of the questions within the survey 15C is formulated using established methodologies for analyzing organizational culture, as will be apparent to a person of ordinary skill in the art in the field of the invention. For example, each question may feature a statement related to one of the cultural traits 70, and each response to one of the questions indicates how strongly the responding member agrees that the statement is applicable to the organization 521. The responses to the organizational cybersecurity hygiene survey 15C form organizational assessment data 17C.

Some examples of questions presented by the organizational cybersecurity hygiene survey 15C may include: "The company provides adequate information and training about cyber-risk," "We continually look out for new cyber-risks and attacks," and "We train people to reduce their cyber-risk profile".

In a preferred embodiment, organizational risk 30 is expressed using a plurality of cultural scores 76. At step 506, the organizational assessment data 17C is received by the risk assessment module 18, and the responses are analyzed to determine the cultural scores 76 for each cultural trait 70. In one embodiment, the responses submitted by all of the members of the organization are averaged together to produce a single cultural score 76 for each cultural trait. The cultural score 76 for each cultural trait 70 may also be determined using a combination, aggregate, or average of each of its related focus areas 74. For example, the organizational assessment data 17C populates sub-scores for each focus area 74 associated with each cultural trait 70.

Cybersecurity risk associated with each cultural trait 70 falls as the cultural score 76 rises. Each sub-score may range from a minimum value of "1" to a maximum value of "100", with the range being divided into quartile categories of "25" points. The sub-scores, and the resulting cultural score 76 may therefore be assigned ascending categorical values of "Low", "Medium", "Elevated", and "High". The overall organizational risk 30 may be based on an average of the various cultural scores 76, with low cultural scores resulting in high organizational risk 30.

In the present example, sample cultural scores 76 of two example organizations are shown: Organization "A" 52A, and Organization "B" 52B. The sub-scores for Organization "A" fall consistently within the highest quartile, while the sub-scores for Organization "B" fall consistently within the lowest quartile. Consequently, the cultural scores 76 of Organization "A" 52A are "High", while the cultural scores 76 of Organization "B" 52B are "Low".

At step 510, the risk assessment module 18 identifies cybersecurity vulnerabilities which may be manifested by the organization 52 based on its cultural scores 76. The potential severity of the cybersecurity vulnerabilities increases as cultural scores 76 fall. For example, an organization 52 exhibiting low cultural scores 76 in the Mission trait 70 are less likely to be able to articulate an effective cybersecurity policy. Low cultural scores 76 in the Consistency trait 70 may demonstrate the lack of coordination of cybersecurity efforts within the organization 52, or inconsistent application of cybersecurity protocols. Sub-scores for particular focus areas 74 may also be used to identify specific cybersecurity vulnerabilities. For example, low sub-scores in Vision may indicate the organization is unable to identify important cybersecurity goals. Low sub-scores in Agreement may indicate the organization is unable to reach a consensus regarding how to achieve its cybersecurity goals. Low sub-scores in Team Orientation may indicate the organization is unable to effectively solve cybersecurity problems at the correct level at which they occur. Low sub-scores in Organizational Learning may indicate the organization is incapable of effectively training its members to deal with cybersecurity threats. Note that the list cybersecurity vulnerabilities presented is not limiting, and a person of ordinary skill in the art in the field of the invention will be able to identify other cybersecurity vulnerabilities as appropriate, based on the cultural scores and sub-scores revealed during the organizational risk assessment.

Once the cybersecurity vulnerabilities linked to the organizational risk 30 have been identified, the risk assessment module 18 generates an organizational action recommendation 36C at step 512 to mitigate or prevent the identified cybersecurity vulnerabilities. Examples of actions may include remedial cybersecurity training to address specific cybersecurity vulnerabilities, reassignment of personnel, as well as monitoring of cybersecurity threats. Any remedial cybersecurity training regimes may be carried out at step 514 by the training module 20.

Returning to FIGS. 4A-D while continuing to refer to FIG. 1A and FIGS. 5A-B, the organizational risk 30 may be utilized to enhance the team-based cybersecurity risk assessment. When determining team cybersecurity risk 62A and team member cybersecurity risk 62B, the cultural scores 76 of the organization 52 may either mitigate or magnify the potential cybersecurity risks associated with teams 50 or team members. For example, if a team 50 and its team members are determined to be at risk of inadvertently propagating bad cybersecurity practices based on the SNA, strongly exhibited cultural traits 70 of Mission and Consistency and correspondingly high cultural scores 76 may mitigate this risk, as the organization may have effectively implemented policies in place for identifying bad cybersecurity practices, and training teams 50 and individual users 12 to follow correct cybersecurity practices. Conversely, if an organization has an ineffective cybersecurity culture and high organizational risk 30, the risk that bad cybersecurity practices will be propagated within a team 50 becomes far greater. Therefore, when conducting the team cybersecurity risk assessment, team cybersecurity risk ratings 62A and team member cybersecurity risk ratings 62B are increased if the identified cybersecurity vulnerabilities at the team level can be linked to a related cultural trait 70 having a low cultural score 76. Conversely, the team cybersecurity risk ratings 62A and team member cybersecurity risk ratings 62B are reduced if the identified cybersecurity vulnerabilities at the team level can be linked to a related cultural trait 70 having a high cultural score 76.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. Other types of languages include XML, XBRL and HTML5. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. Each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flow chart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flow diagrams depicted herein are just one example. There may be many variations to this diagram or the steps (or operations) described therein without departing from the spirit of the disclosure. For instance, the steps may be performed in a differing order and/or steps may be added, deleted and/or modified. All of these variations are considered a part of the claimed disclosure.

In conclusion, herein is presented a cybersecurity system. The disclosure is illustrated by example in the drawing figures, and throughout the written description. It should be understood that numerous variations are possible, while adhering to the inventive concept. Such variations are contemplated as being a part of the present disclosure.

What is claimed is:

1. A method of identifying and mitigating cybersecurity threats against a protected system, the method comprising the steps of:
   presenting a plurality of individual users with a personality cybersecurity assessment survey to collect personality data including a plurality of personality traits of each of the plurality of individual users;
   providing a risk assessment module, wherein the risk assessment module utilizes the personality data to quantify an individual risk for each of the plurality of individual users, identifies cybersecurity vulnerabilities associated with the individual risk, and generates an individual action recommendation; and
   mitigating the cybersecurity vulnerabilities based upon the individual action recommendation through at least one of a training module and an access control module, wherein: the plurality of individual users comprises a team having multiple team members assessed via said risk assessment module, and wherein;
   the risk assessment module further conducts an analysis of relationships between team members and contributions made by each team member, generates a team risk profile based upon the team analysis, identifies cybersecurity vulnerabilities based upon the team risk profile and characteristics of each team member, and generates a team action recommendation;
   further mitigating the cybersecurity vulnerabilities based upon the team action recommendation through at least one of the training module, the access control module, and assigning team members to different teams; and
   the team action recommendation includes limiting access to the protected system for at least one team member.

2. The method of claim 1, wherein the individual action recommendation includes implementing remedial training for at least one of the plurality of individual users.

3. The method of claim 2, wherein the step of mitigating further comprises utilizing the training module to enact the individual action recommendation for the at least one of the plurality of individual users.

4. The method of claim 1, wherein the individual action recommendation includes limiting access to the protected system for at least one of the plurality of individual users.

5. The method of claim 4, wherein the step of mitigating further comprises utilizing the control access module to enact the individual action recommendation for the at least one of the plurality of individual users.

6. The method of claim 1, wherein each of the plurality of personality traits of each of the plurality of individual users is given a sub-score, and each sub-score is used to create at least one composite risk score used by the risk assessment module to identify cybersecurity vulnerabilities.

7. The method of claim 1, wherein each of the plurality of personality traits of each of the plurality of individual users is given a sub-score, and each sub-score is used to create an overall risk score for a respective individual user used by the risk assessment module to identify cybersecurity vulnerabilities.

8. The method of claim 1, wherein the team action recommendation includes implementing remedial training for the team.

9. The method of claim 8, wherein the step of mitigating further comprises utilizing the training module to enact the team action recommendation.

10. The method of claim 1, wherein the step of mitigating further comprises utilizing the control access module to enact the team action recommendation for the at least one team member.

11. The method of claim 1, wherein:
   the plurality of individual users comprises an organization, wherein the risk assessment module further measures cultural traits of the organization, produces an organizational risk profile based upon the cultural traits, identifies cybersecurity vulnerabilities linked to the cultural traits, and generates a cultural action recommendation; and
   further mitigating the cybersecurity vulnerabilities based upon the cultural action recommendation through at least one of the training module, reassignment of organization personnel, and monitoring of cybersecurity vulnerabilities.

12. The method of claim 11, wherein the cultural action recommendation includes implementing remedial training throughout the organization.

13. The method of claim 12, wherein the step of mitigating further comprises utilizing the training module to enact the cultural action recommendation.

14. A system for identifying and mitigating cybersecurity threats, the system comprising:
- a processor; and
- a computer readable memory holding a computer program code executed by the processor, the computer program code configured to:
- present a personality cybersecurity assessment survey to a plurality of individual users;
- collect personality data including a plurality of personality traits of each of the plurality of individual users developed from the personality cybersecurity assessment survey;
- quantify an individual risk for each of the plurality of individual users from the personality data;
- identify cybersecurity vulnerabilities associated with the individual risk;
- generate an individual action recommendation;
- mitigate cybersecurity vulnerabilities by implementing remedial training based upon the individual action recommendation for each of the plurality of individual users; and
- mitigate cybersecurity vulnerabilities by limiting access to protected systems based upon the individual action recommendation for each of the plurality of individual users, wherein:
- the plurality of individual users comprises a team, and the computer program code is configured to:
- further conducts a risk assessment of the team having multiple team members including:
  - performing an analysis of relationships between team members and contributions made by each team member,
  - generating a team risk profile based upon the analysis, identifies cybersecurity vulnerabilities based upon the team risk profile and characteristics of each team member, and
  - generating a team action recommendation;
    - further mitigate cybersecurity vulnerabilities by implementing remedial training based upon the team action recommendation;
    - further mitigate cybersecurity vulnerabilities by limiting access to protected systems based upon the team action recommendation; and
    - further mitigate cybersecurity vulnerabilities by recommending team changes based upon the team action recommendation including assigning team members to different teams.

15. A system for identifying and mitigating cybersecurity threats in an organization, the system comprising:
- a processor; and
- a computer readable memory holding a computer program code executed by the processor, the computer program code configured to:
- present a personality cybersecurity assessment survey to a plurality of individual users;
- collect personality data including a plurality of personality traits of each of the plurality of individual users developed from the personality cybersecurity assessment survey;
- quantify an individual risk for each of the plurality of individual users from the personality data;
- identify cybersecurity vulnerabilities associated with the individual risk;
- generate an individual action recommendation;
- mitigate cybersecurity vulnerabilities by implementing remedial training based upon the individual action recommendation for each of the plurality of individual users; and
- mitigate cybersecurity vulnerabilities by limiting access to protected systems based upon the individual action recommendation for each of the plurality of individual users,
- the plurality of individual users comprises the organization, and the computer program code conducts an organizational risk assessment by measuring cultural traits of the organization, producing an organizational risk profile based upon the cultural traits, identifying cybersecurity vulnerabilities linked to the cultural traits, and generating a cultural action recommendation;
- further mitigate cybersecurity vulnerabilities by implementing remedial training based upon the cultural action recommendation; and
- further mitigate cybersecurity vulnerabilities by recommending organizational changes including reassigning organization personnel, and monitoring cybersecurity vulnerabilities.

\* \* \* \* \*